May 10, 1966 M. E. PIPER 3,250,015
MOUNTING FOR GRADUATED SPIRIT TYPE GAUGES
Filed May 7, 1964 2 Sheets-Sheet 1
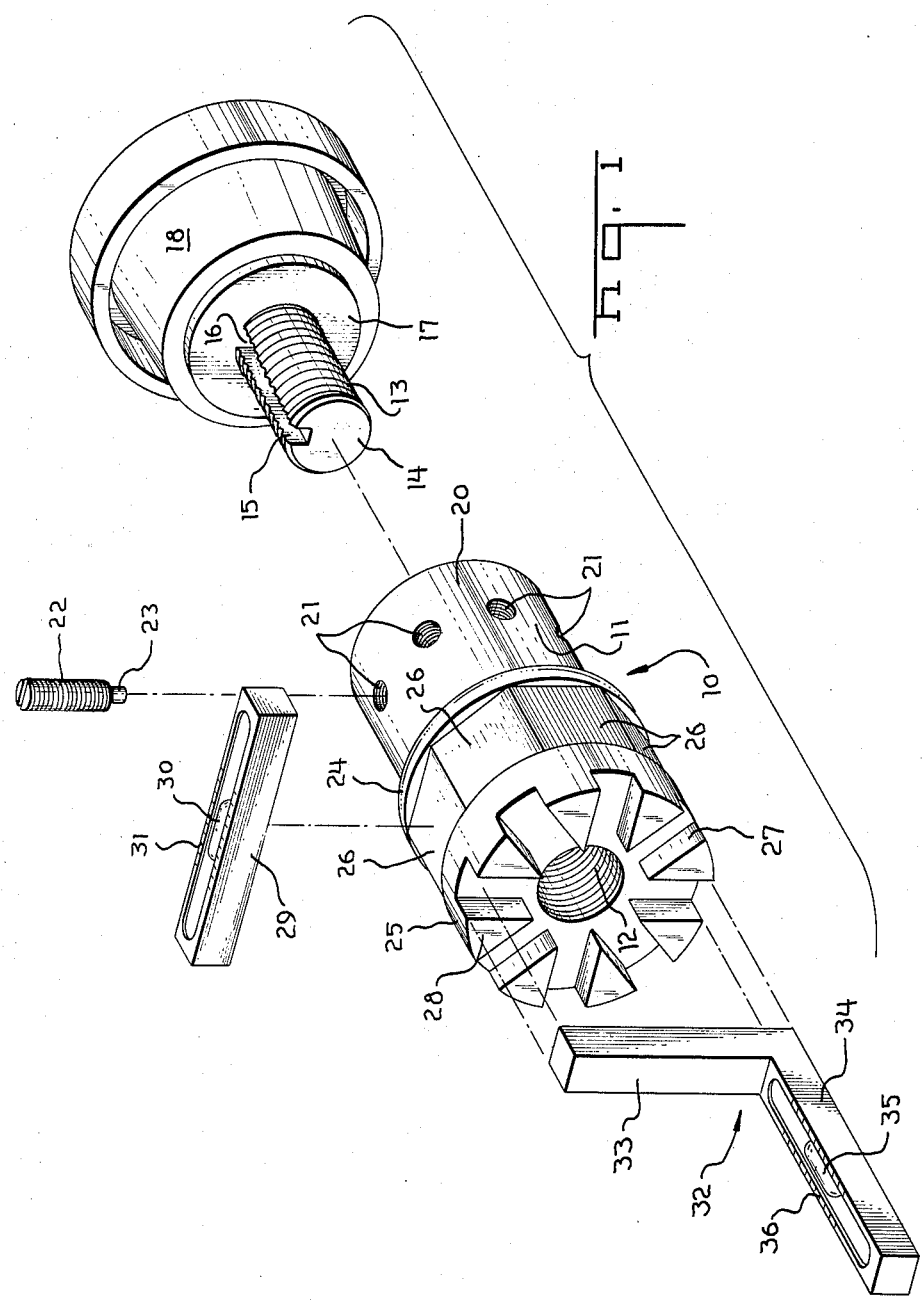
INVENTOR.
MELVIN E. PIPER
BY

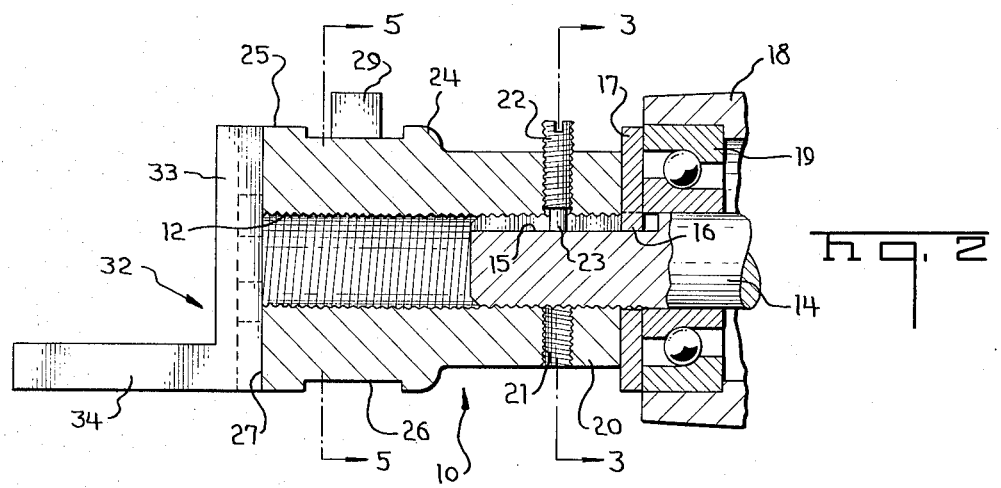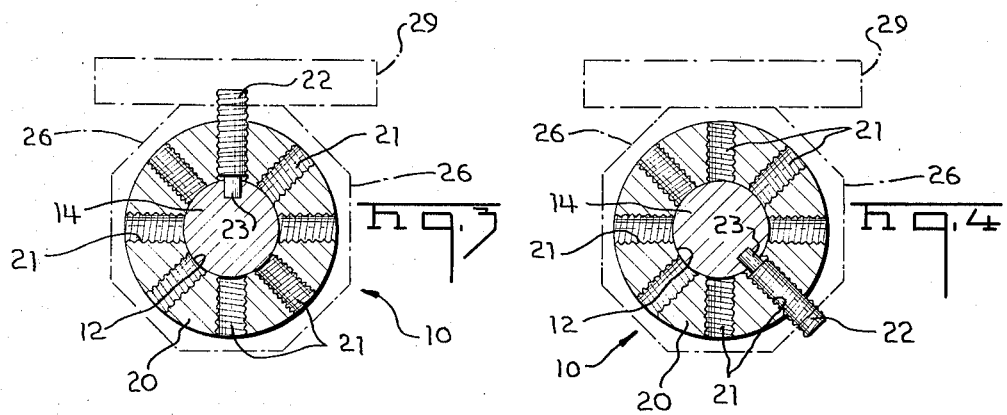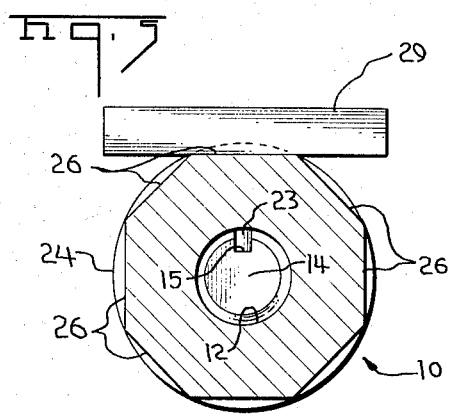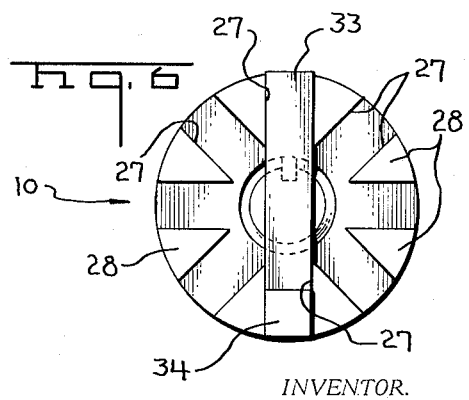

United States Patent Office 3,250,015
Patented May 10, 1966

3,250,015
MOUNTING FOR GRADUATED SPIRIT TYPE GAUGES
Melvin E. Piper, 2324 Union Ave., Altoona, Pa.
Filed May 7, 1964, Ser. No. 365,738
6 Claims. (Cl. 33—203.18)

This invention relates to a mounting for graduated spirit type gauges used in connection with automotive vehicles and more particularly to an accurate and reliable mount for a bubble-level-type gauge particularly as used for measuring or checking the camber and caster wheel inclinations of vehicle front ends.

The front axle for a motor vehicle is usually supported on a pivot pin mounted substantially in a vertical plane longitudinally of the vehicle, with the axis of the pivot pin properly slanting rearwardly. This rearward inclination facilitates the steering of the vehicle, and is termed the caster of the front end.

The axle for the front wheel is properly inclined downwardly in a plane transverse to the longitudinal plane of the vehicle. This locates the bottoms of the front wheels in contact with the roadway, closer together than the tops, or at points 180° from the roadway. This inclination of these steerable wheels is known as the camber.

It is an object of this invention to provide a gauge mounting means that may be quickly and easily attached in predetermined and accurate manner to a front wheel spindle of a motor vehicle, and to which a graduated gauging means may be quickly and easily attached.

Another object of the invention is the provision of a gauging device which is mounted upon and thus automatically aligned with the motor vehicle front wheel spindle so that only one reading is necessary each for caster and camber.

Another object of the invention is the provision of spindle mounting means for a graduated bubble-type gauging device which eliminates free play of the front wheel assembly during measurement.

Another object of the invention is the provisions of a gauging assembly having a plurality of positions for mounting the gauging means to accommodate for various locations of the keyway in the wheel spindle.

An additional object of the invention is a gauge mounting device having an annular series of radially threaded apertures adjacent one end thereof and the provision of a set screw adapted to be positioned in a selected one of said plurality of radial openings in the gauging mount and having a pilot end to engage the keyway of the wheel spindle within said device to lock the gauging mount in a proper predetermined position on the wheel spindle to be supported thereby.

Still another object of the invention is the provision of a gauge mounting device adapted to be mounted upon a front wheel spindle and having an annular series of longitudinal plane faces, tangent to a circle about the axis of the the wheel spindle, on which a magnetized gauging level may be mounted.

Another object of the invention is the provision of a gauging device adapted to be mounted upon a front wheel spindle and having a plurality of radial grooves on the front end thereof which are normal of the axis of the threaded wheel spindle aperture therethrough, in which radial grooves a magnetized mount for a graduated bubble-type gauging level may be mounted and accurately supported thereby.

Another object of the invention is the provision of a horizontally apertured and threaded gauging mount adapted to be affixed to the threaded front wheel spindle of an automotive vehicle and having spaced gauge mounting seats therearound for mounting two graduated spirit level gauges having magnetized bases, one when so mounted extending in a vertical plane through the axis of the wheel spindle and the other extending in a plane normal thereto and parallel to the axis of the pivot pin on which the wheel spindle may swing.

These and other objects will become apparent upon consideration of the following specification taken with the accompanying drawings which together form a complete disclosure of my invention.

In the drawings:
FIG. 1 is a perspective exploded view of the device of this invention in use;
FIG. 2 is a vertical section through the device;
FIG. 3 is a section on the line 3—3 of FIG. 2;
FIG. 4 is a view similar to FIG. 3 showing certain parts in another position;
FIG. 5 is a section on the line 5—5 of FIG. 2; and
FIG. 6 is an end view of the left end of FIG. 2.

Referring now to the drawings, wherein like parts are denoted by like characters of reference, the numeral 10 indicates the gauge mounting means of this invention in its entirety. The gauge mounting means 10 consists of an elongated generally cylindrical block 11 having an axial bore 12 threaded to engage the threads 13 on a wheel spindle 14. The end of this spindle 14 is provided with a keyway 15 to accommodate a key 16 on the retaining washer 17. The vehicle wheel hub is denoted 18 and its outer antifriction bearing is denoted 19. Adjacent the inner end portion 20 of the mounting means 10 is an annular series of threaded radial apertures 21 arranged in a plane and equally spaced in a circumferential direction. A threaded locking pin 22 having a pilot end 23 is adapted to engage a selected one of the openings 21 for a purpose later to appear. Outwardly of the inner end portion 20 the block 11 is enlarged as at 24 and 25. There are a plurality of flats 26 equal in number to the threaded apertures 21 and normal to the radial planes through the axis and the apertures 21.

At the outer end of the cylindrical portion 25, there is a plurality of radial grooves or troughs 27, equal in number and in the same radial planes as the apertures 21, and having triangular lands 28 therebetween. The bottoms of these grooves 27 are preferably normal to the axis of the gauge mounting means 10 and the sides thereof are perpendicular to the bottoms.

It is known that most automotive front wheel spindles have a keyway 15 at the top dead center thereof, however, there are other positions used for such a keyway. The mounting means of this invention is therefore designed to accommodate all such positions.

In use, the usual castellated nut is first removed from the wheel spindle 14 and the mounting means 10 is threaded on said spindle into firm abutting engagement with the washer 17. The mounting means 10 may be jammed against the washer 17 or it may be backed off so that a set screw 22 may then be inserted into the threaded aperture 21 over the keyway 15 and turned in until the pilot end 23 engages within that keyway. In this position one of the flats 26 will be normal to an axial plane extending radially through the keyway 15 and at the same time one of the radial grooves 27 will be in said plane. An elongated bar-like magnetized level member 29 having a graduated bubble-type gauge 30 therein or a graduated scale 31 may be placed on the topmost edge or flat 26 to indicate from the gauge the caster adjustment, or the rearward inclination of the vehicle king pin.

A second and L-shaped magnetized level member 32 is adapted to have its upright leg portion 33 to closely fit within one of the grooves 27, such as the one in the same plane as the screw 22 and normal to the flat 26 on which the level 29 rests. The horizontal leg 34 of this L-shaped member 32 comprises a level member having a bubble-type gauge 35 therein and a graduated scale 36 similar to the member 29 which indicates the downward inclination of the wheel spindle 14, in the plane of the portion 33. This indication by means of the bubble 35 and the scale 36 is a measurement of the camber of the axle spindle 14. Any departure from normal will be apparent from the scales 31 and 36, so that suitable corrections may be noted and made.

It is preferred to make the mounting means 10 of some suitable paramagnetic material, such as cold rolled steel, so that magnetized level holders may be readily mounted thereon. The device is unitary for quick and accurate mounting on the threaded vehicle wheel spindle as described so that it, plus the gauges, gives a most reliable indication of any departure from the normal caster and camber of the spindle and its mounting.

The embodiment of the invention herein described is for illustrative purposes only and it is to be expressly understood that this specification and drawings do not define the limits of the scope of this invention, which is to be determined from the appended claims.

What I claim is:

1. A mounting device for means for measuring caster and camber of a vehicle wheel spindle mounting wherein the spindle has the usual keyway and spindle nut, comprising a generally cylindrical gauge mounting block having portions of different diameters, said block having a generally horizontal threaded aperture therethrough adapted to be threaded onto a steerable wheel spindle in lieu of the spindle nut and to engage the bearing thereon, said block having a plurality of circumferentially spaced means therearound selectively engageable with the keyway in the spindle at one of a plurality of positions circumferentially of the block, and said block having circumferentially spaced flats therearound one for each said spaced means, whereby to selectively support a gauge on said block.

2. The structure as defined in claim 1 wherein said block further includes a radially disposed means on a portion of larger diameter for each said flat accurately supporting a level having a bubble movable in a axial plane through said keyway.

3. The structure as defined in claim 2 wherein each said flat is a level supporting means having an indicator movable in a plane normal to the axis of said keyway, and wherein the means entering the keyway is a screw engaging one of a plurality of threaded apertures at each of said plurality of circumferential positions.

4. The structure as defined in claim 3 including a plurality of circumferentially disposed flats, one for each of the plurality of threaded apertures and each flat being normal to a plane through a corresponding threaded aperture and the axis of the spindle.

5. The structure as defined in claim 4 including a plurality of radial grooves at the larger outer end of the block, each of said grooves being in the plane of a corresponding threaded aperture and the axis of the spindle, said grooves being adapted to receive, align and support the substantially vertical arm of an L-shaped level, and wherein the horizontal arm thereof is provided with a bubble-type indicator movable in a direction substantially parallel to the axis of the spindle.

6. The structure as defined in claim 5 wherein at least one of the L-shaped level arms is magnetized, and wherein the supporting block is formed of paramagnetic material.

References Cited by the Examiner

UNITED STATES PATENTS

| | | | |
|---|---|---|---|
| 2,032,399 | 3/1936 | Button | 33—203.18 |
| 2,077,082 | 4/1937 | Wedlake | 33—203.18 |
| 2,608,368 | 8/1952 | Bagge et al. | 33—203.18 |
| 3,188,747 | 6/1965 | Race | 33—203.18 |

ISAAC LISANN, *Primary Examiner.*

WILLIAM D. MARTIN, *Assistant Examiner.*